United States Patent
Im et al.

(10) Patent No.: US 8,402,410 B2
(45) Date of Patent: Mar. 19, 2013

(54) METHOD AND APPARATUS FOR MANAGING CONFIGURATION MEMORY OF RECONFIGURABLE HARDWARE

(75) Inventors: Chae-seok Im, Suwon-si (KR); Gyu-sang Choi, Seoul (KR); Si-hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1167 days.

(21) Appl. No.: 12/076,276

(22) Filed: Mar. 14, 2008

(65) Prior Publication Data

US 2009/0063790 A1   Mar. 5, 2009

(30) Foreign Application Priority Data

Aug. 27, 2007 (KR) .................. 10-2007-0086276
Jan. 22, 2008 (KR) .................. 10-2008-0006700

(51) Int. Cl.
  G06F 17/50 (2006.01)
  G06F 9/00 (2006.01)
  G06F 15/177 (2006.01)
  G06F 1/24 (2006.01)
(52) U.S. Cl. ............ 716/117; 716/121; 713/2; 713/100
(58) Field of Classification Search .......... 716/117, 716/121; 703/2, 100
  See application file for complete search history.

(56) References Cited

U.S. PATENT DOCUMENTS

| 5,297,291 | A | 3/1994 | Murphy |
| 5,339,406 | A | 8/1994 | Carney et al. |
| 5,768,584 | A * | 6/1998 | MacDonald et al. ............. 713/1 |
| 7,565,477 | B2 * | 7/2009 | Shibata et al. ................. 711/103 |
| 7,747,933 | B2 * | 6/2010 | Johnson ......................... 714/799 |
| 2003/0229877 | A1 * | 12/2003 | Bersch et al. .................... 716/16 |
| 2004/0060032 | A1 * | 3/2004 | McCubbrey ..................... 716/16 |
| 2004/0117755 | A1 * | 6/2004 | Blodget et al. .................. 716/17 |
| 2006/0248493 | A1 * | 11/2006 | Osann ............................. 716/16 |
| 2008/0040700 | A1 * | 2/2008 | Katoh et al. ..................... 716/18 |
| 2009/0150621 | A1 * | 6/2009 | Lee ................................. 711/149 |
| 2012/0042317 | A1 * | 2/2012 | Nguyen et al. ................. 718/102 |

FOREIGN PATENT DOCUMENTS

| JP | 59-119447 | 7/1984 |
| JP | 06-044085 | 2/1994 |
| JP | 07-160483 | 6/1995 |
| KR | 10-2006-0091358 | 8/2006 |

OTHER PUBLICATIONS

"ADRES: An Architecture with Tightly Coupled VLIW Processor and Coarse-Grained Reconfigurable Matrix," Bingfeng Mei et al., 10 pages.
"Configuration Prefetch for Single Context Reconfigurable Coprocessors," Scott Hauck, *ACM/SIGDA International Symposium on Field-Programmable Gate Arrays*, 1998, 10 pages.

* cited by examiner

*Primary Examiner* — Phallaka Kik
(74) *Attorney, Agent, or Firm* — Staas & Halsey LLP

(57) ABSTRACT

Provided is a method of managing a configuration memory of reconfigurable hardware which can reconfigure hardware according to hardware configuration information. The method includes: determining at least one slot capable of currently storing the hardware configuration information on the basis of the states of a plurality of slots of the configuration memory; and storing hardware configuration information, which is stored in an external memory, in the determined at least one slot capable of currently storing the hardware configuration information. Accordingly, memory utilization can be improved even in dynamic environment such as data dependent control flow or multi-tasking.

20 Claims, 14 Drawing Sheets

FIG. 6A

| NUMBER OF STORAGE AREA | STATE INFORMATION | INDEX INFORMATION OF SLOT | SIZE |
|---|---|---|---|
| NUMBER OF STORAGE AREA | STATE INFORMATION | INDEX INFORMATION OF SLOT | SIZE |
| ... | ... | ... | ... |
| NUMBER OF STORAGE AREA | STATE INFORMATION | INDEX INFORMATION OF SLOT | SIZE |

FIG. 6B

| NUMBER OF SLOT | STATE INFORMATION | INDEX INFORMATION OF STORAGE AREA |
|---|---|---|
| NUMBER OF SLOT | STATE INFORMATION | INDEX INFORMATION OF STORAGE AREA |
| ... | ... | ... |
| NUMBER OF SLOT | STATE INFORMATION | INDEX INFORMATION OF STORAGE AREA |

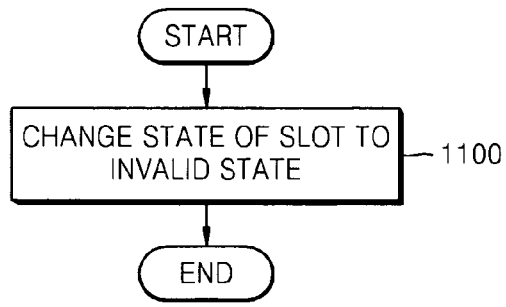
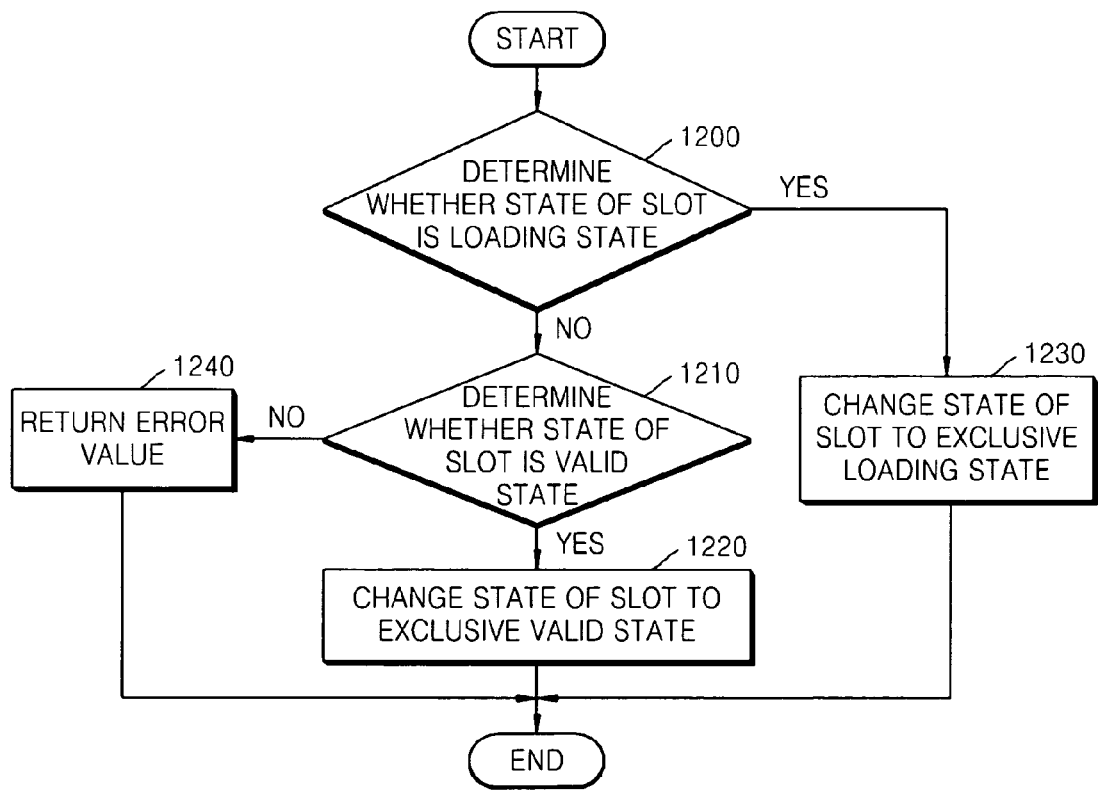

METHOD AND APPARATUS FOR MANAGING CONFIGURATION MEMORY OF RECONFIGURABLE HARDWARE

CROSS-REFERENCE TO RELATED PATENT APPLICATION

This application claims priority form Korean Patent Application Nos. 10-2007-0086276, filed on Aug. 27, 2007 and 10-2008-0006700, filed on Jan. 22, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to managing a configuration memory of reconfigurable hardware, and more particularly, to dynamically managing a configuration memory of reconfigurable hardware.

2. Description of the Related Art

Application specific integrated circuits (ASICs) are non-memory semiconductor chips customized for specific electronics, and information and communications products. A field programmable gate array (FPGA) is a semiconductor device containing programmable logic components called logic blocks and programmable interconnects. The logic blocks can be programmed to perform the functions of basic logic gates, such as AND and XOR, and more complex combinational functions, such as decoders. The FPGA may be manufactured to verify the behavior and performance of previously designed hardware before the hardware is finally produced as a semiconductor chip. A hierarchy of the programmable interconnects allows the logic blocks to be interconnected as needed. Furthermore, modern FPGAs can be programmed at runtime so that some circuits perform other works.

Reconfigurable systems using an FPGA or coarse grained array (CGA) are 10 times (or more) slower than general circuits and require many disconnected unnecessary elements, resulting in inefficient space usage. Accordingly, reconfigurable systems using an FPGA or CGA have been used for limited purposes, for example, for programming and verifying the functions of circuits as emulation before prototypes are developed or for developing small quantity products in a short time. Recent developments in technology have offered high-speed high density hardware. Also, as system verification is becoming increasingly important and product cycle is changing rapidly, the applications of reconfigurable systems are increasing.

Hardware reconfigurable systems refer to systems that can reconfigure hardware through programming. Programming is performed using hardware configuration information stored in a memory called a configuration memory. Accordingly, if a plurality of pieces of hardware configuration information necessary for hardware components having different functions are stored in a configuration memory, a hardware reconfigurable system can perform a variety of functions using necessary hardware configuration information pieces. The hardware reconfigurable system meets requirements of application due to its performance that is the advantage of hardware and its flexibility that is the advantage of software.

Here, a configuration memory, which stores hardware configuration information usable to reconfigure hardware included in a hardware reconfigurable system, is a memory that can most rapidly access the reconfigurable hardware. If new hardware configuration information is stored in the configuration memory, the hardware reconfigurable system reconfigures the hardware using the new hardware configuration information stored in the configuration memory. In general, when M denotes the number of a plurality of storage areas constituting the configuration memory and each of the storage areas is a slot, the size of the configuration memory is determined by M×(the size of the slot). Since the configuration memory has M slots, the hardware reconfigurable system including the configuration memory supports multi-context.

Here, multi-context is a method of storing a plurality of pieces of hardware configuration information used to reconfigure hardware in a memory, updating the stored hardware configuration information with other hardware configuration information as needed, and reconfiguring the hardware by using the updated hardware configuration information. A hardware reconfigurable system using multi-context rapidly reconfigures hardware through switch between hardware configuration information stored in a configuration memory.

SUMMARY OF THE INVENTION

The present invention provides a method and apparatus for managing a configuration memory of reconfigurable hardware which can optimize the determination of a storage area of the configuration memory when the determination of the storage area is dependent on the kind or size of data or when a plurality of programs simultaneously use the configuration memory by providing the state of a storage area of the configuration memory and a command to change the state of the storage area and dynamically determining the position of the storage area in which hardware configuration information is to be stored.

The present invention also provides a computer-readable recording medium having embodied thereon a computer program for executing the method.

According to an aspect of the present invention, there is provided a method of managing a configuration memory of reconfigurable hardware which can reconfigure hardware according to hardware configuration information, the method comprising:
determining at least one slot capable of currently storing the hardware configuration information on the basis of the states of a plurality of slots of the configuration memory; and
storing hardware configuration information, which is stored in an external memory, in the determined at least one slot capable of currently storing the hardware configuration information.

According to another aspect of the present invention, there is provided an apparatus for managing a configuration memory of reconfigurable hardware which can reconfigure hardware according to hardware configuration information, the apparatus comprising: a memory managing unit determining at least one slot capable of currently storing the hardware configuration information on the basis of the states of a plurality of slots of the configuration memory, and storing hardware configuration information, which is stored in an external memory, in the determined at least one slot capable of currently storing the hardware configuration information; and a storing unit storing the states of the plurality of slots of the configuration memory.

According to another aspect of the present invention, there is provided a computer-readable recording medium having embodied thereon a computer program for executing the method.

Technical problems to be solved by the present invention are not limited to the aforesaid problems which will be clearly understood from the following description by those of ordinary skill in the art.

BRIEF DESCRIPTION OF THE DRAWINGS

The above and other features and advantages of the present invention will become more apparent by describing in detail exemplary embodiments thereof with reference to the attached drawings in which:

FIG. 6 illustrates a configuration memory table and an external memory table stored in a storing unit of the apparatus of FIG. 5;

FIG. 11 is a flowchart illustrating a method of managing a configuration memory using an invalidate command according to an exemplary embodiment of the present invention;

FIG. 12 is a flowchart illustrating a method of managing a configuration memory using a lock command according to an exemplary embodiment of the present invention;

DETAILED DESCRIPTION OF THE INVENTION

The present invention will now be described more fully with reference to the accompanying drawings, in which exemplary embodiments of the invention are shown.

Figure 1:
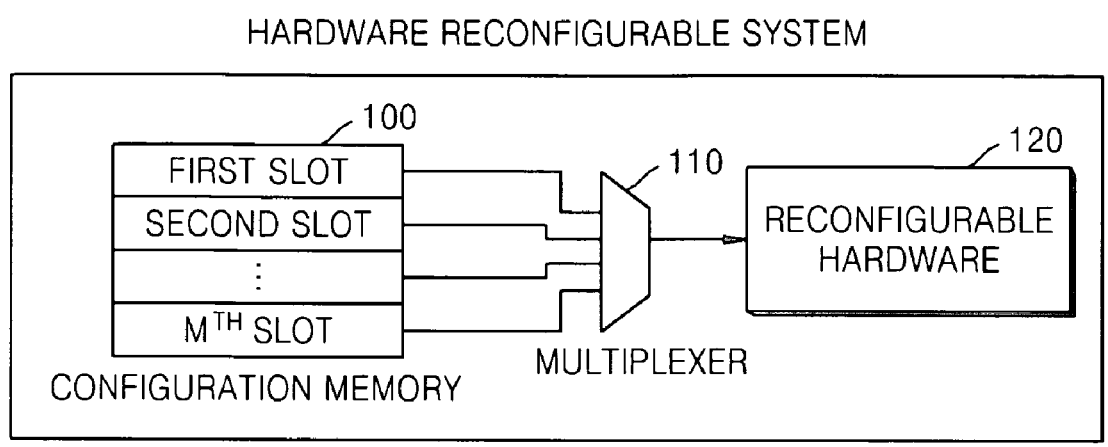
FIG. 1 is a schematic view for explaining static allocation among methods of managing a configuration memory of reconfigurable hardware.

FIG. 1 is a schematic view for explaining static allocation among methods of managing a configuration memory of reconfigurable hardware.

A process of reconfiguring hardware will be explained first. A program for a specified purpose is compiled, a code resulting from the compiling of the program is stored in a code memory (not shown), and hardware configuration information is controlled using the stored code to reconfigure hardware.

Static allocation determines at compile time the positions of all slots of a configuration memory in which hardware configuration information for reconfiguring hardware is to be stored, and does not use any external memory. Referring to FIG. 1, a hardware reconfigurable system includes a configuration memory 100 consisting of first through $M^{th}$ slots, a multiplexer 110, and reconfigurable hardware 120.

Hardware configuration information to be input to the reconfigurable hardware 120 through the multiplexer 110 is stored in predetermined slots of the configuration memory 100. The hardware configuration information respectively stored in the slots is data used to reconfigure the reconfigurable hardware 120. Since the static allocation determines at compile time the positions of slots mapped to all the pieces of hardware configuration information used to reconfigure the hardware, and does not use an external memory to store the hardware configuration information as described above, the slots in which all the pieces of hardware configuration information are to be stored are determined in advance during memory management. Accordingly, since the slots in which all the hardware configuration information is to be stored are determined during the memory management, there is no overhead caused by insufficient slots of the configuration memory 100, but the hardware functions of the hardware reconfigurable system are limited by the maximum size of the configuration memory 100.

Figure 2:
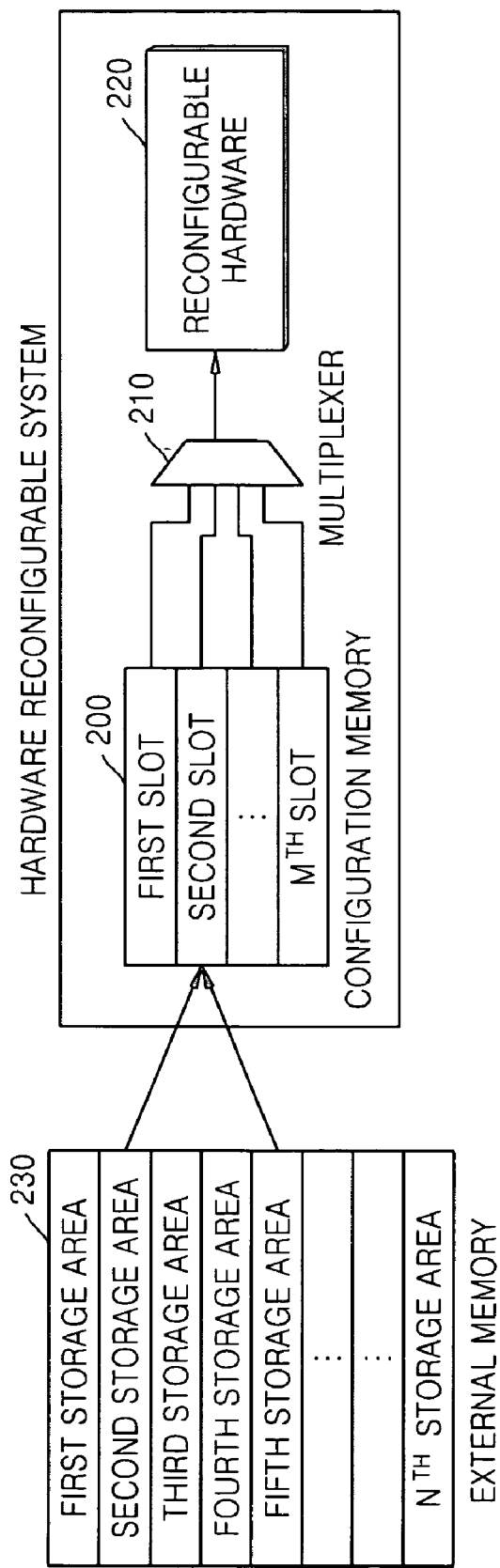
FIG. 2 is a schematic view for explaining memory overlay among the methods of managing the configuration memory of the reconfigurable hardware.

FIG. 2 is a schematic view for explaining memory overlay among the methods of managing the configuration memory of the reconfigurable hardware. Referring to FIG. 2, a hardware reconfigurable system includes a configuration memory 200 consisting of first through $M^{th}$ slots, a multiplexer 210, and reconfigurable hardware 220. An external memory 230 comprises N storage areas where N is a natural number.

Memory overlay stores a plurality of pieces of hardware configuration information used to perform different functions in the external memory 230, maps the pieces of hardware configuration information stored in the external memory 230 with the slots of the configuration memory 200, and uses the mapped pieces of hardware configuration information to reconfigure hardware. Accordingly, the memory overlay can use more hardware configuration information to reconfigure hardware than the static allocation can.

Referring to FIG. 2, the memory overlay stores hardware configuration information, which is stored in the external memory 230, in the configuration memory 200 as needed. Accordingly, the hardware functions of the hardware reconfigurable system of FIG. 2 are affected by the size of the external memory 230 whereas the static allocation is affected by the size of the configuration memory 100. Since hardware configuration information stored in the second storage area and hardware configuration information stored in the fifth storage area of the external memory 230 can be mapped to the second slot of the configuration memory 200, the memory overlay can store more hardware configuration information than the static allocation can.

Accordingly, the memory overlay allows the hardware functions of the hardware reconfigurable system to increase as the size of the external memory 230 increases. However, like the static allocation, the memory overlay determines at compile time the positions of all slots of the configuration memory 200 in which a plurality of pieces of hardware configuration information are to be stored. Accordingly, codes resulting from the compiling of a program contain information on which slots of the configuration memory 200 are mapped to the pieces of hardware configuration information stored in the storage areas of the external memory 230. Both the hardware configuration information stored in the second storage area and the hardware configuration information stored in the fifth storage area of the external memory 230 are mapped to the second slot of the configuration memory 200, and information on the mapping is already determined at compile time. Accordingly, although the static allocation and the memory overlay are suitable for a program having a simple structure that allows a user to previously determine mapping between storage areas and slots, the static allocation and the memory overlay cannot optimally use an external memory and a configuration memory when mapping between storage areas and slots is dependent on the kind or size of data or when a plurality of programs simultaneously use the storage areas and slots.

Figure 3:
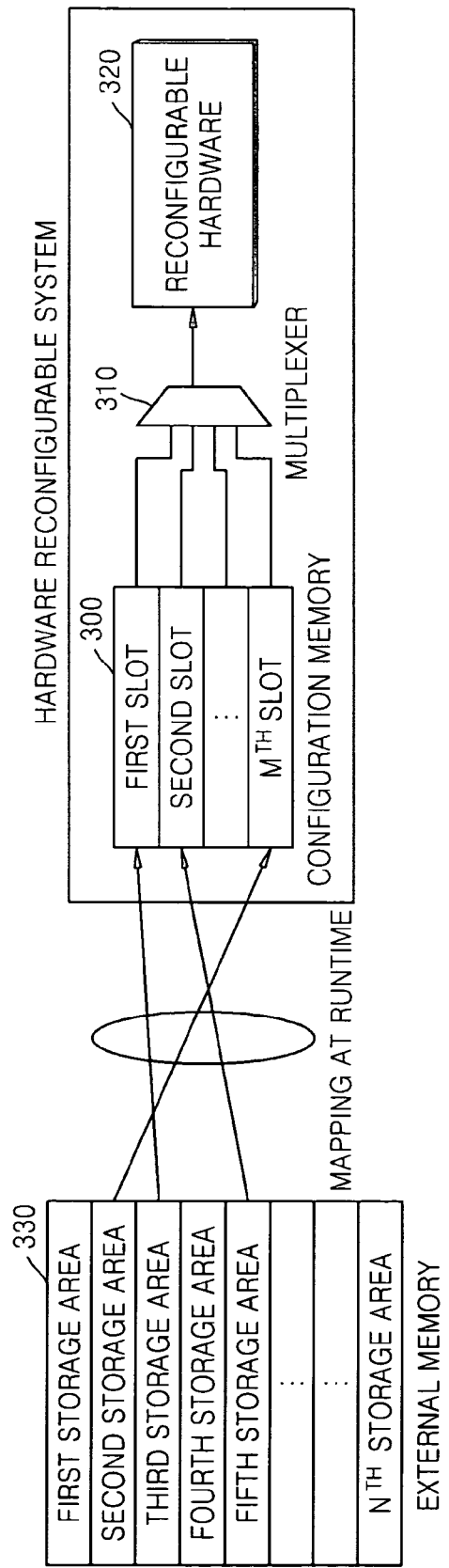
FIG. 3 is a schematic view for explaining dynamic allocation according to an exemplary embodiment of the present invention among the methods of managing the configuration memory of the reconfigurable hardware.

FIG. 3 is a schematic view for explaining dynamic allocation according to an exemplary embodiment of the present invention among the methods of managing the configuration memory of the reconfigurable hardware. Referring to FIG. 3, a hardware reconfigurable system includes a configuration memory 300, a multiplexer 310, and reconfigurable hardware 320. The configuration memory 300 consists of first through $M^{th}$ slots, which can store hardware configuration information, where M is a natural number. An external memory 330 includes N storage areas where N is a natural number.

The hardware reconfigurable system using the dynamic allocation stores a plurality of pieces of hardware configuration information in the storage areas of the external memory 330, and determines at runtime which slots of the configuration memory 300 are mapped to the pieces of hardware configuration information while codes resulting from the compiling of a program for reconfiguring hardware are executed. While the memory overlay of FIG. 2 determines at compile time which slots of the configuration memory are mapped to the hardware configuration information stored in the external memory 230, the dynamic allocation of FIG. 3 determines at runtime which slots of the configuration memory 300 are mapped to the hardware configuration information stored in the external memory 330 while the codes resulting from the compiling of the program for reconfiguring the hardware are executed. The hardware reconfigurable system using the dynamic allocation will now be explained in detail.

Figure 4:
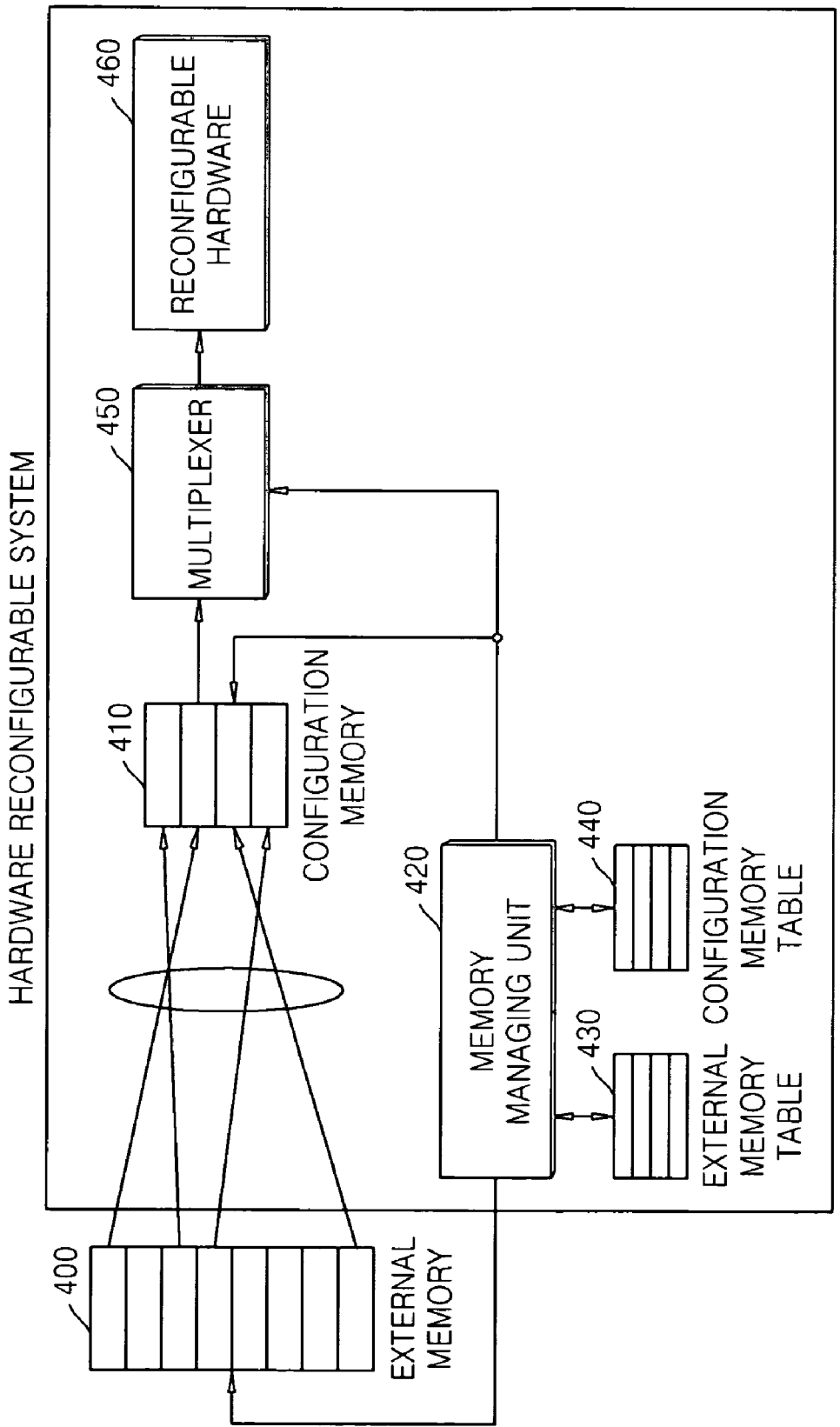
FIG. 4 is a schematic view of a hardware reconfigurable system according to an exemplary embodiment of the present invention.

FIG. 4 is a schematic view of a hardware reconfigurable system.

Referring to FIG. 4, the hardware reconfigurable system includes a configuration memory 410, a memory managing unit 420, an external memory table 430, a configuration memory table 440, a multiplexer 450, and reconfigurable hardware 460.

An external memory 400, which stores hardware configuration information, is located outside the hardware reconfigurable system. The external memory 400 includes a plurality of storage areas, and hardware configuration information for reconfiguring hardware requires at least one storage area.

The configuration memory 410 stores hardware configuration information received from the external memory 400. The configuration memory 410 includes a plurality of slots and a plurality of pieces of hardware configuration information is respectively stored in the slots. Here, the slots are storage areas of the configuration memory 410 in which the pieces of hardware configuration information are stored.

The external memory table 430 shows information on the storage state of the external memory 400. The information on the storage state of the external memory 400 includes the state information of each of the plurality of storage areas constituting the external memory 400, the index information of each of the slots of the configuration memory 410 mapped to the storage areas, and the size of the hardware configuration information stored in each of the storage areas. The external memory table 430 will be explained later in detail with reference to FIG. 6.

The configuration memory table 440 shows information on the storage state of the configuration memory 410. The information on the storage state of the configuration memory 410 includes the state information of each of the plurality of slots constituting the configuration memory 410 and the index information of each of the storage areas of the external memory 400 mapped to the slots.

The memory managing unit 420 receives command signals for the external memory 400 or the configuration memory 410 from a code memory (not shown) in which codes are stored and performs an operation according to the command signals. When codes resulting from the compiling of a program for reconfiguring hardware are executed, the memory managing unit 420 manages the external memory 400 and the configuration memory 410 using commands stored in the memory managing unit 420. For example, when codes are executed, a specific command among the codes is called, and the memory managing unit 420 executes the specific command with respect to the external memory 400 or the configuration memory 400 in response to the call. The memory managing unit 420 uses the pieces of information stored in the external memory table 430 and the configuration memory table 440 to execute the command called from the codes. Commands executed by the memory managing unit 420 will now be explained.

When the memory managing unit 420 receives a prefetch command from the codes as a result of code execution, the memory managing unit 420 stores hardware configuration information stored in a storage area of the external memory 400 in a slot of the configuration memory 410. According to an exemplary embodiment of the present invention, in order to store the hardware configuration information in the slot of the configuration memory 410 according to the prefetch command, the index of the storage area of the external memory 400 and the index of the slot of the configuration memory 410 are necessary.

When the memory managing unit 420 receives an execute command from the codes as a result of code execution, the memory managing unit 420 outputs the hardware configuration information stored in the slot of the configuration memory 410 to the multiplexer 450.

When the memory managing unit 420 receives an invalidate command from the codes as a result of code execution, the memory managing unit 420 changes the state of the storage area or slot, which are corresponding to the invalidate command and are stored in the external memory table 430 and the configuration memory table 440, to an invalid state. Here, the invalid state means a state where the slot of the configuration memory 410 and the storage area of the external memory 400 are not mapped to each other. The fact that the slot of the configuration memory 410 and the storage area of the external memory 400 are not mapped to each other means that the hardware configuration information stored in the slot cannot be used to reconfigure hardware. That is, when the state of the slot is an invalid state, the memory managing unit 420 does not use the hardware configuration information stored in the slot of the invalid state. New hardware configuration information can be stored in the slot of the invalid state, and the hardware configuration information stored in the slot of the invalid state does not have to be eliminated. The memory managing unit 420 makes the state information of the storage area of the external memory table 430 to be the same as the state information of the slot of the configuration memory table 440 mapped with the storage area. Accordingly, the state information of the storage area of the external memory table 430 does not show the state information of the storage area, but shows the state information of the slot of the configuration memory 410 for convenience of memory management.

When the memory managing unit 420 receives a lock command for a first slot and a first storage area from the codes as a result of code execution, the memory managing unit 420 changes the state of the first storage area of the external memory table 430 and the state information of the first slot of the configuration memory table 440 to an exclusive state or an exclusive loading state where the first storage area of the external memory 400 can exclusively use the first slot of the configuration memory 410 mapped thereto. When the memory managing unit 420 receives the lock command, if the state information of each of the first storage area and the first slot is a valid state, the memory managing unit 420 changes the state of each of the first storage area and the first slot to an exclusive state, and if the state information of each of the first storage area and the first slot is a loading state, the memory managing unit 420 changes the state of each of the first storage area and the first slot to an exclusive loading state. Here, the state where the first storage area can exclusively use the first slot means that a second storage area other than the first storage area cannot be mapped to the first slot. The invalid state, the loading state, the valid state, the exclusive loading state, and the exclusive valid state will be explained later in detail with reference to FIG. 6.

When the memory managing unit 420 receives an unlock command for a first slot and a first storage area from the codes as a result of code execution, the memory managing unit 420 reads the state information of the first storage area and the first slot from the external memory table 430 and the configuration memory table 440. If the state of each of the first storage area and the first slot is an exclusive valid state, the memory managing unit 420 changes the state to a valid state, and if the state information is an exclusive loading state, the memory managing unit 420 changes the state of each of the first storage area and the first slot to a loading state. The state information of the storage areas and the slots will be explained later in detail with reference to FIG. 6.

The multiplexer 450 is controlled by the memory managing unit 420 to output only hardware configuration information selected among one or more pieces of hardware configuration information received from the configuration memory 410 to the reconfigurable hardware 460.

The reconfigurable hardware 460 is a device capable of reconfiguring hardware components, such as a fine-grained array (FGA) or a coarse grained array (CGA).

Figure 5:
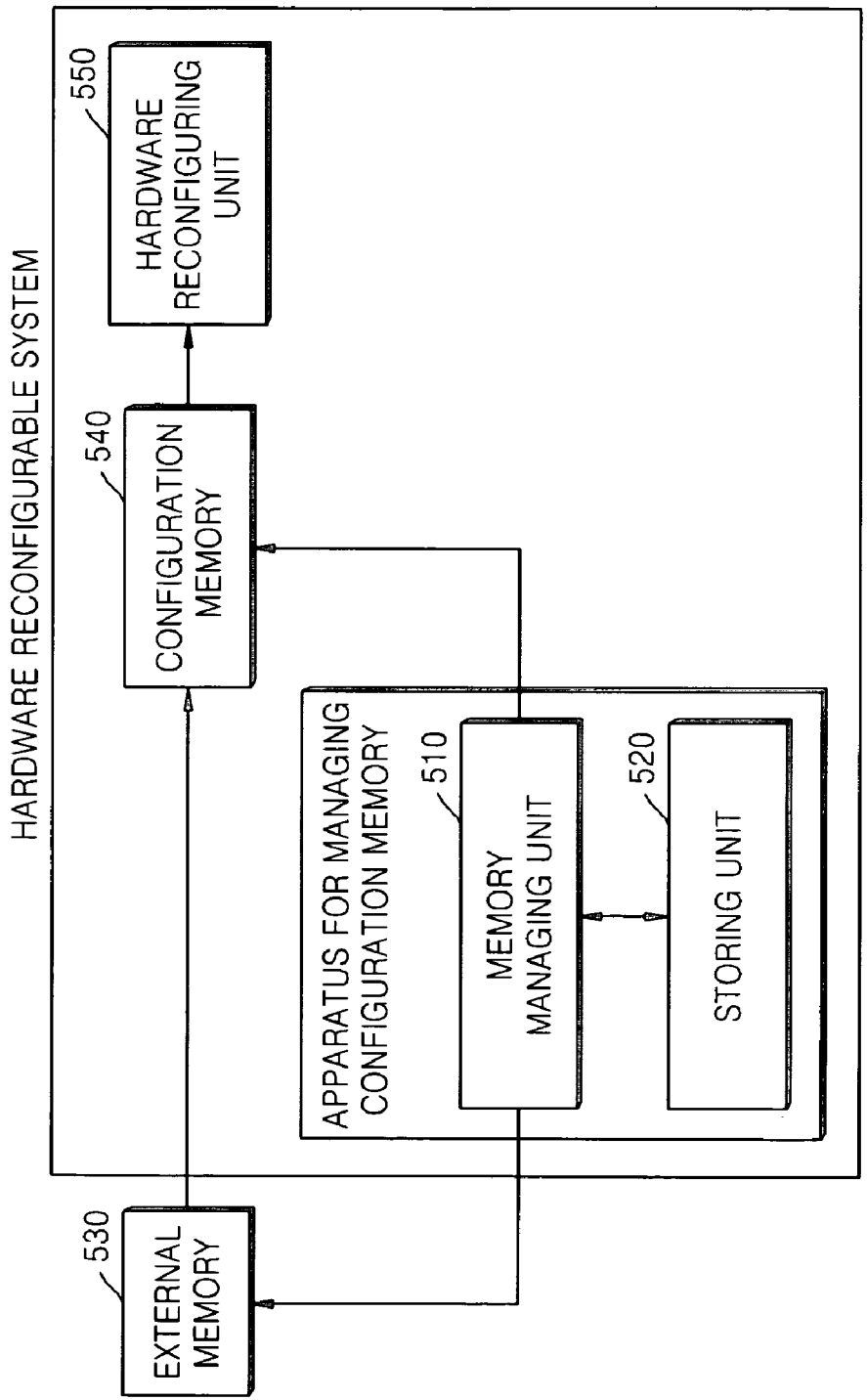
FIG. 5 is a block diagram of an apparatus for managing a configuration memory of reconfigurable hardware according to an exemplary embodiment of the present invention.

FIG. 5 is a block diagram of an apparatus for managing a configuration memory of reconfigurable hardware according to an exemplary embodiment of the present invention.

Referring to FIG. 5, the apparatus includes a memory managing unit 510 and a storing unit 520.

The memory managing unit 510 determines at least one slot among slots considering the states of the slots constituting a configuration memory 540 when hardware configuration information is transmitted from an external memory 530 to the configuration memory 540. A method of determining at least one slot is performed as follows.

The memory managing unit 510 first selects and determines one or more slots of invalid state among the slots constituting the configuration memory 540. The invalid state is a state where a slot of the configuration memory 540 and a storage area of the external memory 530 are not mapped to each other. However, when there is no slot of an invalid state or when the size of the hardware configuration information is greater than the size of the slot of the invalid state, a slot of a valid state is further selected. The valid state is a state where a slot of the configuration memory 540 and a storage area of the external memory 530 are mapped to each other.

The memory managing unit 510 executes commands called from codes as a result of code execution. The commands executed by the memory managing unit 510 will be explained later with reference to FIG. 7.

The storing unit 520 stores information on the storage areas constituting the external memory 530 and information on the slots constituting the configuration memory 540. The information on the storage areas includes the state information of the slots mapped to the storage areas, the index information of the mapped slots, and the size of the hardware configuration information. The information on the slots includes the state information of the slots and the index information of the mapped storage areas. The information on the storage areas and the information on the slots are shown in tables which will be explained later in detail with reference to FIG. 6.

The configuration memory 540 receives and stores therein the hardware configuration information that is stored in the external memory 530. The configuration memory 540 includes a plurality of slots that are respectively storage areas. The slots are respectively mapped to the storage areas of the external memory 530.

A hardware reconfiguring unit 550 reconfigures hardware using the hardware configuration information received from the configuration memory 540 of the apparatus for managing the configuration memory of the reconfigurable hardware. The hardware reconfiguring unit 550 may be an FPGA or a CGA.

FIG. 6 illustrates an external memory table and a configuration memory table stored in the storing unit 520 of FIG. 5 according to an exemplary embodiment of the present invention. The external memory table and the configuration memory table will now be explained with reference to FIGS. 5 and 6. FIG. 6A illustrates the external memory table, and FIG. 6B illustrates the configuration memory table.

Referring to FIG. 6A, the external memory table includes the number of a storage area, state information, the index information of a slot, and the size of hardware configuration information.

The number of a storage area is allocated to each storage area to distinguish the plurality of storage areas constituting the external memory 530.

The state information is information on the state of a slot of the configuration memory 540 corresponding to a storage area of the external memory 530. The state of a slot of the configuration memory 540 is divided into an invalid state, a loading state, a valid state, an exclusive loading state, and an exclusive valid state.

When the state of a slot is an invalid state, hardware configuration information stored in the slot is not valid and the slot of the configuration memory 410 is not mapped to any storage area of the external memory 400. When the state of the slot is a loading state, hardware configuration information stored in the storage area of the external memory 530 is being transmitted to the slot of the configuration memory 540. When the state of the slot is a valid state, the slot of the configuration memory 540 and the storage area of the external memory 530 are mapped to each other and hardware can be reconfigured using hardware configuration information stored in the slot.

When the state of the slot is an exclusive loading state, the hardware configuration information stored in the storage area of the external memory 530 is being transmitted to the slot of the configuration memory 540, and also, the slot of the exclusive loading state is not mapped to a storage area other than the storage area mapped to the slot. When the state of the slot is an exclusive valid state, the slot of the exclusive valid state of the configuration memory 540 is not mapped to a storage area other than the storage area mapped to the slot of the exclusive valid state, and hardware can be reconfigured using the hardware configuration information stored in the slot of the exclusive valid state.

The index information on a slot is information on the index of the slot of the configuration memory 540 mapped to the storage area of the external memory 530.

The size is the size of hardware configuration information stored in a storage area of the external memory 530. The size of the hardware configuration is defined by the number of storage areas of the external memory 530 in which the hardware configuration information is stored.

Referring to FIG. 6B, the configuration memory table includes the number of a slot, state information, and the index information of a storage area.

The number of a slot is allocated to each slot to distinguish the plurality of slots, which are the plurality of storage areas, constituting the configuration memory 540.

The state information is information on the state of a slot of the configuration memory 540 corresponding to a storage area of the external memory 530, similarly to the state information of the external memory table. The state of a slot is divided into an invalid state, a loading state, a valid state, an exclusive loading state, and an exclusive valid state.

The index information of a storage area is information on the index of the storage area of the external memory 530 mapped to the slot of the configuration memory 540.

Figure 7:
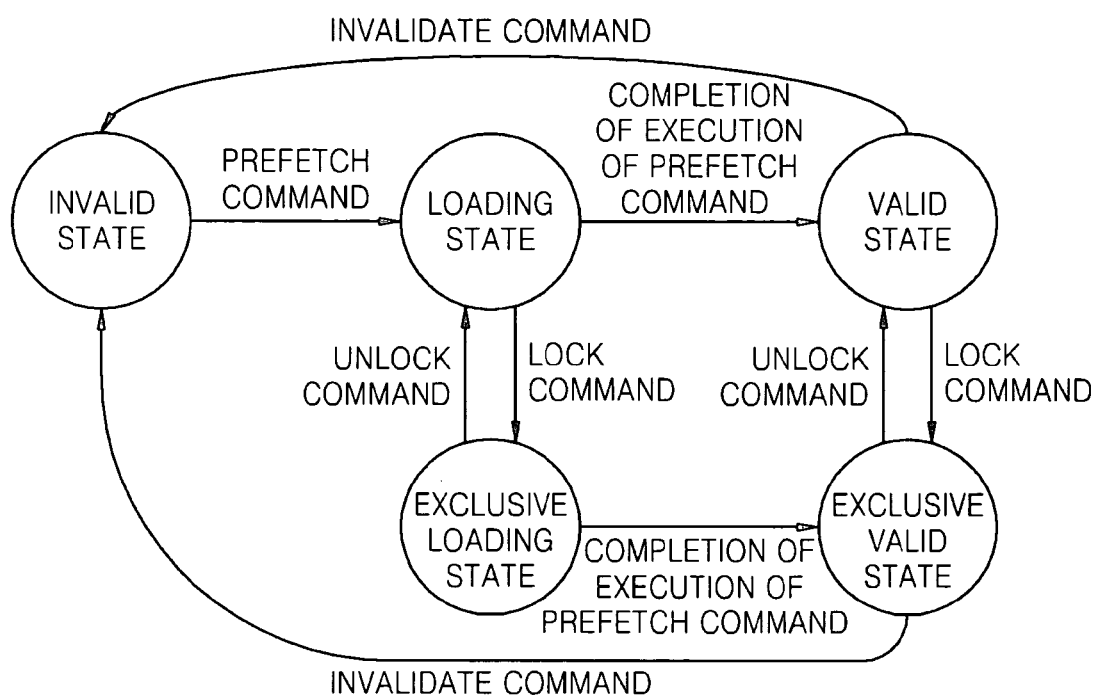
FIG. 7 is a state transition diagram between the states of storage areas or slots.

FIG. 7 is a state transition diagram between the states of storage areas or slots. A method of changing a state using a command will now be explained with reference to FIGS. 5 and 7.

An invalid state, a loading state, a valid state, an exclusive loading state, and an exclusive valid state of FIG. 7 may be changed when the memory managing unit 510 changes the state information on the external memory table and the configuration memory table of FIG. 6. The initial state of a storage area or a slot is an invalid state and may be changed to another state according to an executed command.

When the state of a slot is an invalid state and a prefetch command is received, the apparatus for managing the configuration memory of the reconfigurable memory of FIG. 5 changes the state of the corresponding slot and storage area on the external memory table and the configuration memory table to a loading state and transmits hardware configuration information stored in the storage area of the external memory 530 to the slot of the configuration memory 540.

When the state of a slot is a loading state and the execution of a prefetch command is completed, the apparatus changes the state of the corresponding slot and storage area on the external memory table and the configuration memory table to a valid state.

When the state of a slot is a valid state and a lock command is received, the apparatus changes the state of the corresponding slot and storage area on the external memory table and the configuration memory table to an exclusive valid state. When the state of a slot is a loading state and a lock command is received, the apparatus changes the state of the corresponding slot and storage area on the external memory table and the configuration memory table to an exclusive loading state.

When the state of a slot is an exclusive loading and the execution of a prefetch command is completed, the apparatus changes the state of the corresponding slot and storage area on the external memory table and the configuration memory table to an exclusive valid state.

When the state of a slot is an exclusive valid state and an unlock command is received, the apparatus changes the state of the corresponding slot and storage area on the external memory table and the configuration memory table to a valid state. When the state of a slot is an exclusive loading state and an unlock command is received, the apparatus changes the state of the corresponding slot and storage area on the external memory table and the configuration memory table to a loading state.

The apparatus can execute an execute command when the state of a slot is a valid state or an exclusive valid state. When the state of a slot is a valid state or an exclusive valid state and an invalidate command is received, the apparatus changes the state of the corresponding slot and storage area on the external memory table and the configuration memory table to an invalid state.

Figure 8:
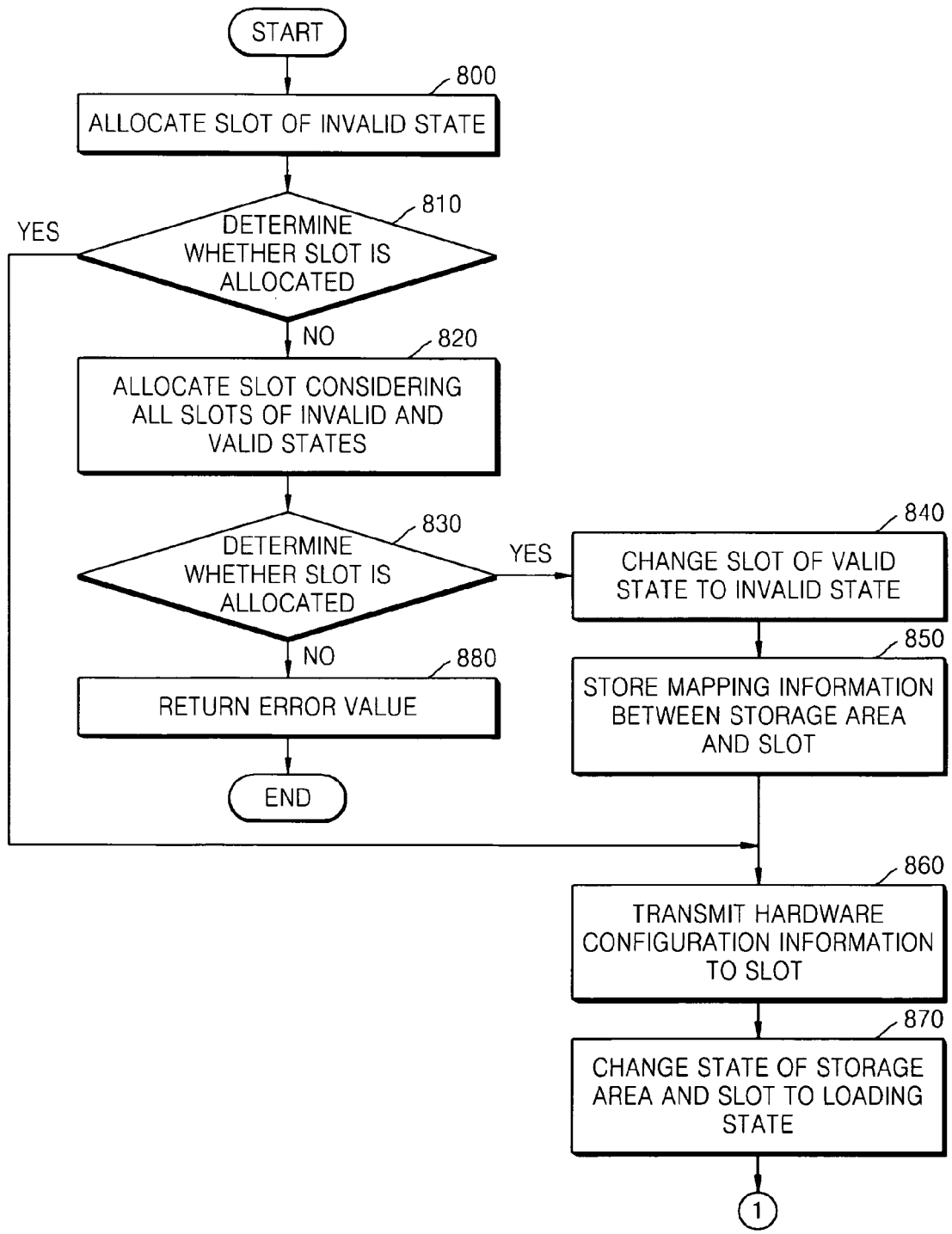
FIG. 8 is a flowchart illustrating a method of managing a configuration memory of reconfigurable hardware using a prefetch command according to an exemplary embodiment of the present invention.

FIG. 8 is a flowchart illustrating a method of managing a configuration memory of reconfigurable hardware using a prefetch command according to an exemplary embodiment of the present invention. A method of managing a configuration memory of reconfigurable hardware using a prefetch command will now be explained with reference to FIGS. 5 and 8.

In operation 800, the apparatus for managing the configuration memory allocates at least one slot of an invalid state among the slots of the configuration memory 540 for hardware configuration information stored in at least one storage area of the external memory 530.

In operation 810, it is determined whether the slot of the invalid state for the hardware configuration information is allocated. When it is determined in operation 810 that the slot of the invalid state is allocated, the method proceeds to operation 860, and when it is determined in operation 810 that the slot of the invalid state is not allocated, the method proceeds to operation 820.

In operation 820, the apparatus allocates at least one slot considering all slots of invalid and valid states. In this case, a slot of an invalid state is allocated first, and when there is no slot of an invalid state or the size of hardware configuration information is greater than the size of the slot of the invalid state, a slot of a valid state is allocated. The slot of the valid state may be allocated according to a predetermined standard. For example, a slot storing hardware configuration information whose usage is the lowest may be selected first of all, or a slot of a valid state may be randomly selected.

In operation 830, it is determined whether the allocation of slot is completed. When it is determined in operation 830 that allocation of slot is completed, the method proceeds to operation 840, and when it is determined in operation 830 that allocation of slot is not completed, the method proceeds to operation 880 and returns an error value.

In operation 840, the apparatus changes a slot of a valid state among the slots allocated in operation 820 to a invalid state. If there is no slot of a valid state, operation 840 is not performed.

In operation 850, the apparatus stores mapping information between the storage area of the external memory 530 and the slot allocated in operation 820 in the storing unit 520. Referring to FIG. 6, mapping information is the index information of a slot of the external memory table and the index information of a storage area of the configuration memory table, and shows from which storage area a slot receives hardware configuration information or to which slot hardware configuration information of a storage area is transmitted.

In operation 860, the apparatus transmits hardware configuration information stored in the storage area of the external memory 530 to the slot of the configuration memory allocated in operation 820.

In operation 870, the apparatus changes the state of each of the storage area and the slot stored in the storing unit 520 to a loading state.

Figure 9:
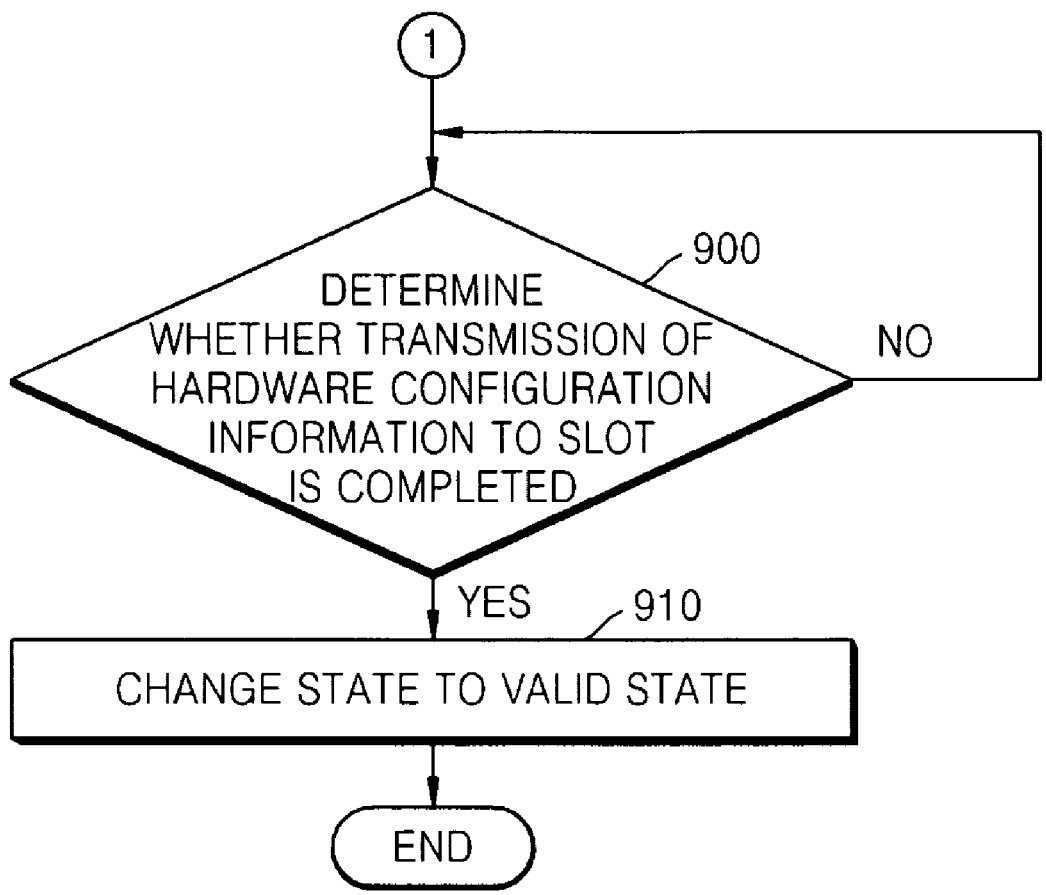
FIG. 9 is a flowchart illustrating a method of managing a configuration memory of reconfigurable hardware when the execution of the prefetch command is completed according to an exemplary embodiment of the present invention.

FIG. 9 is a flowchart illustrating a method of managing a configuration memory when the execution of a prefetch command is completed according to an exemplary embodiment of the present invention. A method of managing a configuration memory when the execution of a prefetch command is completed will now be explained with reference to FIGS. 5 and 9.

In operation 900, the apparatus determines whether the transmission of the hardware configuration information from the storage area of the external memory 530 to the slot of the configuration memory 540 is completed and waits until the transmission is completed.

When it is determined in operation 900 that the transmission of the hardware configuration information from the storage area of the external memory 530 to the slot of the configuration memory 540 is completed, the method proceeds to operation 910. In operation 910, the apparatus changes the state of each of the storage area and the slot stored in the storing unit 520 to a valid state.

Figure 10:
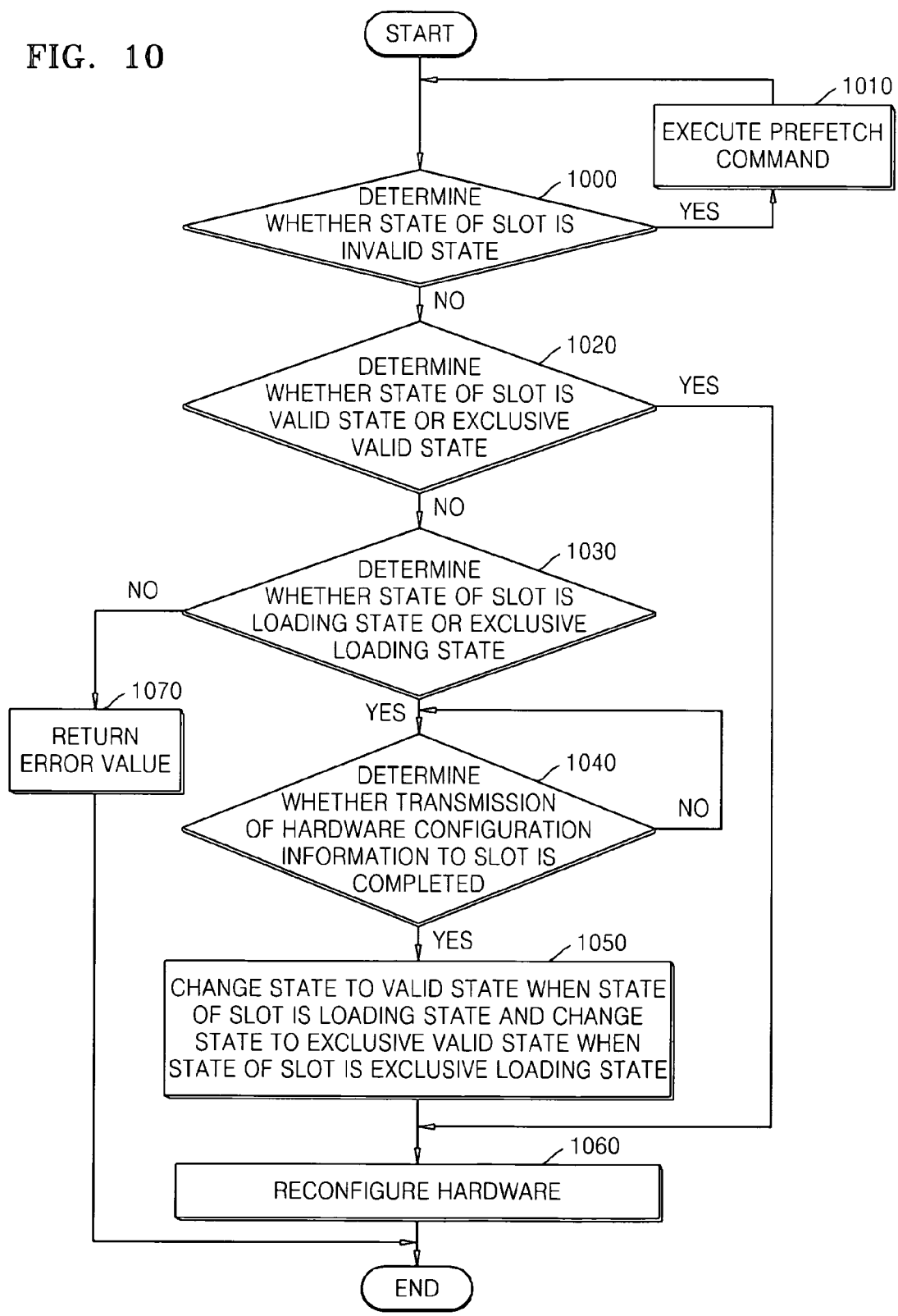
FIG. 10 is a flowchart illustrating a method of managing a configuration memory using an execute command according to an exemplary embodiment of the present invention.

FIG. 10 is a flowchart illustrating a method of managing a configuration memory using an execute command according to an exemplary embodiment of the present invention. A method of managing a configuration memory using an execute command will now be explained with reference to FIGS. 5 and 10.

In operation 1000, the apparatus determines whether the state of a slot is an invalid state from the external memory table and the configuration memory table stored in the storing unit 520. When it is determined in operation 1000 that the state of the slot is an invalid state, the method proceeds to operation 1010, and when it is determined in operation 1000 that the state of the slot is not an invalid state, the method proceeds to operation 1020.

In operation 1010, the apparatus executes a prefetch command. Once a hardware reconfigurable system executes a prefetch command, the state of the slot is changed to any one of a loading state, a valid state, an exclusive loading state, and an exclusive valid state.

In operation 1020, the apparatus determines whether the state of the slot, which is the object of the execute command, is a valid state or an exclusive valid state from the external memory table and the configuration memory table stored in the storing unit 520. When it is determined in operation 1020 that the state of the slot is any one of the valid state and the exclusive valid state, the method proceeds to operation 1060, and when it is determined in operation 1020 that the state of the slot is not any one of the valid state and the exclusive valid state, the method proceeds to operation 1030.

In operation 1030, the apparatus determines whether the state of the slot, which is the object of the execute command, is a loading state or an exclusive loading state from the external memory table and the configuration memory table stored in the storing unit 520. When it is determined in operation 1030 that the state of the slot is any one of the loading state and the exclusive loading state, the method proceeds to operation 1040, and when it is determined in operation 1030 that the state of the slot is not any one of the loading state and the exclusive loading state, the method proceeds to operation 1070.

In operation 1040, the apparatus determines whether the transmission of the hardware configuration information from the storage area of the external memory 530 to the slot of the configuration memory 540 is completed, and waits until the transmission of the hardware configuration information is completed.

In operation 1050, when the state of the slot of the configuration memory 540 is determined to be a loading state from the external memory table and the configuration memory table stored in the storing unit 520, the apparatus changes the state of the slot to a valid state, and when the state of the slot of the configuration memory 540 is determined to be an exclusive loading state, the apparatus changes the state of the slot to an exclusive valid state.

In operation 1060, the apparatus reconfigures hardware of the reconfigurable system using the hardware configuration information stored in the slot.

In operation 1070, the apparatus returns an error value.

FIG. 11 is a flowchart illustrating a method of managing a configuration memory using an invalidate command according to an exemplary embodiment of the present invention. A method of managing a configuration memory using an invalidate command will now be explained with reference to FIGS. 5 and 11.

In operation 1100, the apparatus changes the state of a slot of the configuration memory 540, which is the object of an invalidate command, to an invalid state. Since the state of the slot is changed to an invalid state using the invalidate command, the hardware configuration information stored in the corresponding slot becomes invalid, and the slot is not mapped to a storage area. The apparatus may input hardware configuration information in a slot of an invalid state ahead of slots of any other states.

FIG. 12 is a flowchart illustrating a method of managing a configuration memory using a lock command according to an exemplary embodiment of the present invention. A method of managing a configuration memory using a lock command will now be explained with reference to FIGS. 5 and 12.

In operation 1200, the apparatus determines whether the state of a slot of the configuration memory 540, which is the object of a lock command, is a loading state from the external memory table and the configuration memory table stored in the storing unit 520. When it is determined in operation 1200 that the state of the slot is not a loading state, the method proceeds to operation 1210, and when it is determined in operation 1200 that the state of the slot is a loading state, the method proceeds to operation 1230.

In operation 1210, the apparatus determines whether the state of the slot, which is the object of the lock command, is a valid state from the external memory table and the configuration memory table stored in the storing unit 520. When it is determined in operation 1210 that the state of the slot is a valid state, the method proceeds to operation 1220, and when it is determined in operation 1210 that the state of the slot is not a valid state, the method proceeds to operation 1240.

In operation 1220, the apparatus changes the state of the slot stored in the storing unit 520 to an exclusive valid state.

In operation 1230, the apparatus changes the state of the slot stored in the storing unit 520 to an exclusive loading state.

In operation 1240, the apparatus returns an error value.

Figure 13:
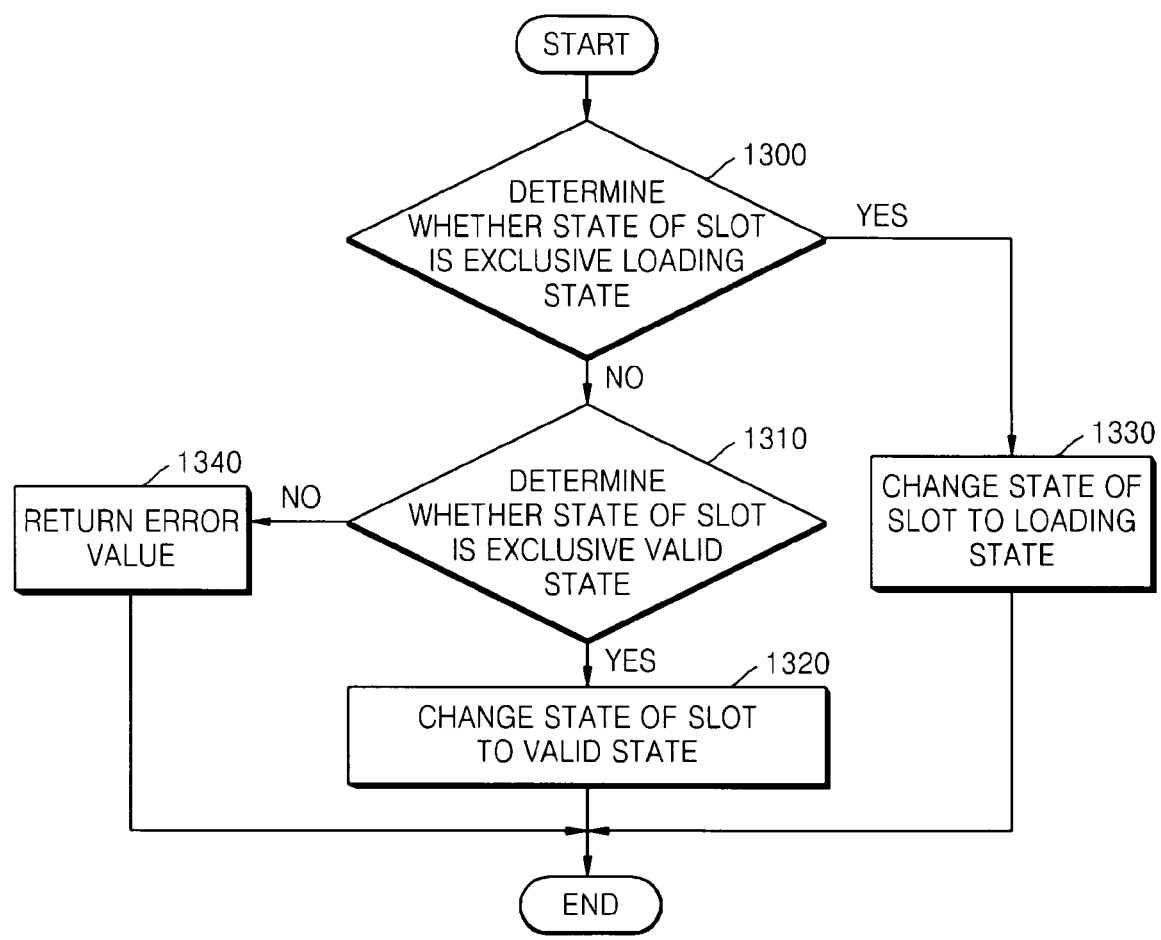
FIG. 13 is a flowchart illustrating a method of managing a configuration memory using an unlock command according to an exemplary embodiment of the present invention.

FIG. 13 is a flowchart illustrating a method of managing a configuration memory using an unlock command according to an exemplary embodiment of the present invention. A method of managing a configuration memory using an unlock command will now be explained with reference to FIGS. 5 and 13.

In operation 1300, the apparatus determines whether the state of a slot of the configuration memory 540, which is the object of an unlock command, is an exclusive loading state from the external memory table and the configuration memory table stored in the storing unit. When it is determined in operation 1300 that the state of the slot is not an exclusive loading state, the method proceeds to operation 1310, and when it is determined in operation 1300 that the state of the slot is an exclusive loading state, the method proceeds to operation 1330.

In operation 1310, the apparatus determines whether the state of the slot, which is the object of the unlock command, is an exclusive valid state from the external memory table and the configuration memory table stored in the storing unit 520. When it is determined in operation 1310 that the state of the slot is an exclusive valid state, the method proceeds to operation 1320, and when it is determined in operation 1310 that the state of the slot is not an exclusive valid state, the method proceeds to operation 1340.

In operation 1320, the apparatus changes the state of the slot stored in the storing unit 520 to a valid state.

In operation 1330, the apparatus changes the state of the slot stored in the storing unit 520 to a loading state.

In operation 1340, the apparatus returns an error value.

A method of effectively managing a configuration memory by using reconfigurable hardware when there exist a plurality of tasks which are independent tasks including one or more pieces of hardware configuration information that can change the configuration of the reconfigurable hardware according to another exemplary embodiment of the present invention will now be explained. Although two tasks, that is, a task A and a task B, are accomplished by using the reconfigurable hardware below, the present invention is not limited thereto and two or more tasks may be accomplished.

It is assumed that that task A includes one or more pieces of hardware configuration information a1 through aN where N is a natural number, and the task B includes one or more pieces of hardware configuration information b1 through bM where M is a natural number. The tasks A and B may be independent tasks, or may be dependent tasks exchanging inputs and outputs. When the hardware configuration information of the task A and B is used to reconfigure hardware by using the configuration memory, in order to efficiently use the configuration memory, a time for which the configuration memory is used needs to be scheduled for the tasks A and B. If the tasks A and B are independent tasks, a time for which the configuration memory 410 or the reconfigurable hardware 460 is used may be scheduled equally or differently for the tasks A and B. If the tasks A and B are dependent tasks, that is, if an output corresponding to the task A is used as an input corresponding to the task B, a time for which the configuration memory 410 or the reconfigurable hardware 460 is used may be determined so that the task B can be accomplished after the accomplishment of the task A is completed.

Figure 14A:
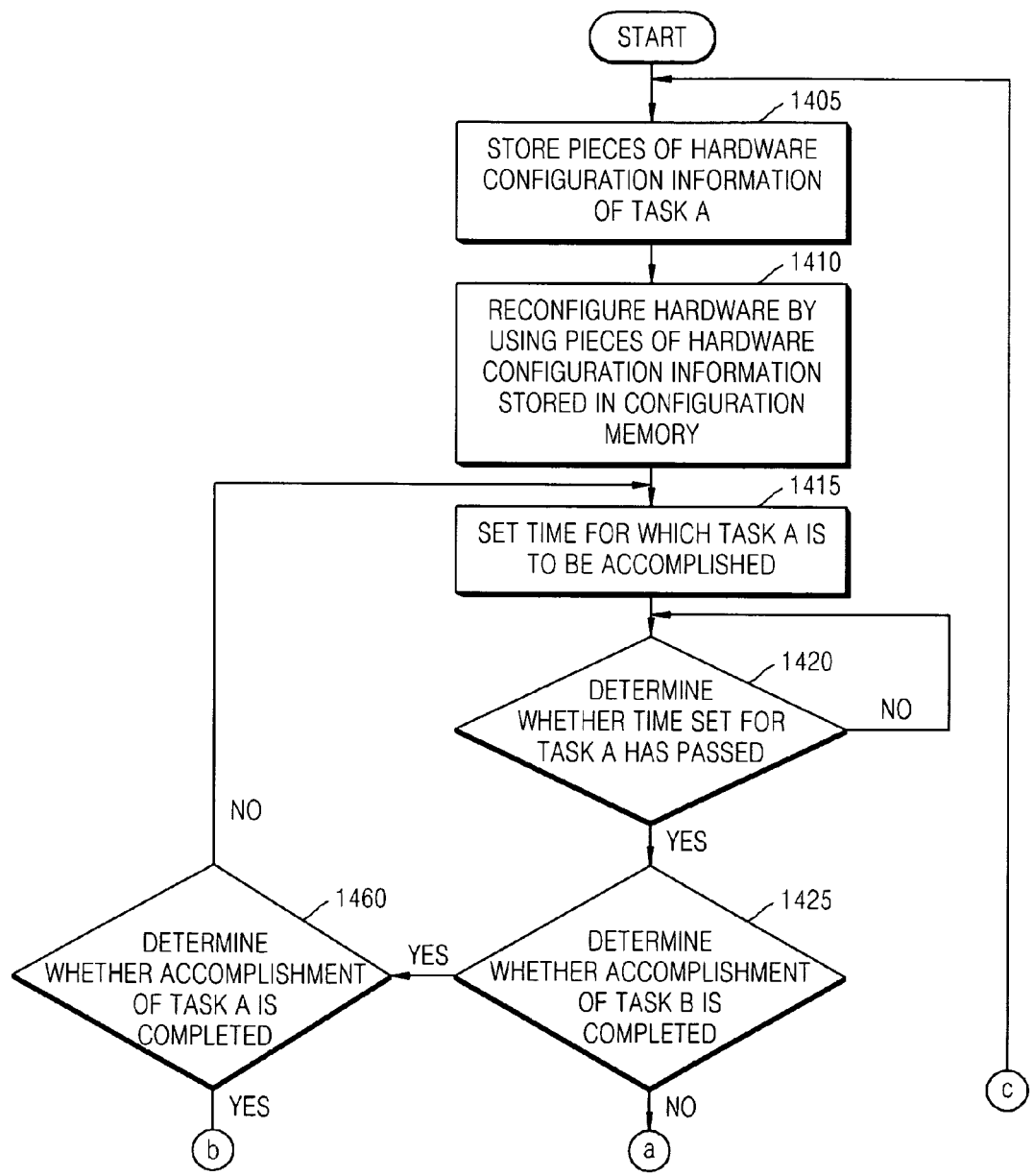
FIGS. 14A and 14B show a flowchart of a method of managing a configuration memory of reconfigurable hardware when tasks are accomplished according to another exemplary embodiment of the present invention.
Figure 14B:
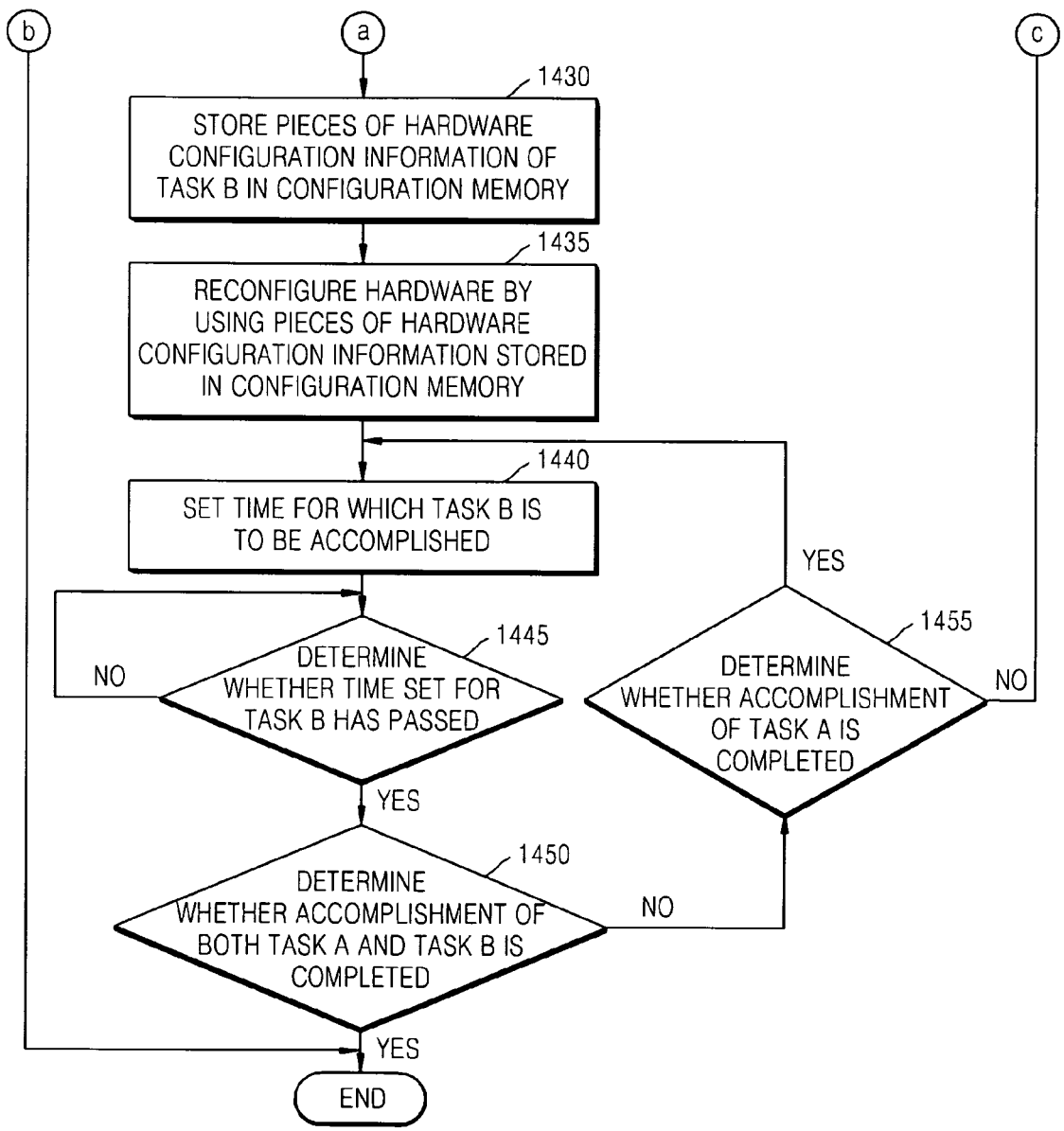

FIGS. 14A and 14B show a flowchart of a method of managing a configuration memory of reconfigurable hardware when tasks A and B are accomplished according to another exemplary embodiment of the present invention. A method of managing a configuration memory of reconfigurable hardware when tasks A and B are accomplished will now be explained with reference to FIG. 4.

In operation 1405, the apparatus for managing the configuration memory stores a plurality of pieces of hardware configuration information a1 through aN of the task A, which are stored in the external memory 400, in the configuration memory 410 according to the method of FIGS. 8 through 13.

In operation 1410, the apparatus reconfigures the reconfigurable hardware 460 by using the pieces of hardware configuration information stored in the configuration memory 410.

In operation 1415, the apparatus sets a time for which the task A is to be accomplished.

In operation 1420, the apparatus determines whether the time set for the task A has passed. When it is determined in operation 1420 that the time set for the task A has not passed, the apparatus waits until the time set for the task A has passed. When it is determined in operation 1420 that the time set for the task A has passed, the method proceeds to operation 1425.

In operation 1425, the apparatus determines whether the accomplishment of the task B is completed. The fact that the accomplishment of a task is completed means that the reconfigurable hardware 460 is no longer used to implement the task. When it is determined in operation 1425 that the accomplishment of the task B is not completed, the method proceeds to operation 1430 to accomplish the task B. When it is determined in operation 1425 that the accomplishment of the task B is completed, the method proceeds to operation 1460. In operation 1460, it is determined whether the accomplishment of the task A is completed.

In operation 1430, the apparatus stores a plurality of pieces of hardware configuration information b1 through bM of the task B, which are stored in the external memory 400, in the configuration memory 410. In order to store the hardware configuration information of the task B in the configuration memory 410, the apparatus changes the states of slots of the configuration memory 410 to invalid state, such that the hardware configuration information of the task A already stored in the slot is no longer used and the hardware configuration information of the task B can be stored in the slot of the invalid state. If some of the pieces of the hardware configuration information of the task A are the same as some of the pieces of the hardware configuration information of the task B, only different pieces of hardware configuration information between the task A and the task B may be newly stored.

In operation 1435, the apparatus reconfigures the reconfigurable hardware 460 by using the hardware configuration information of the task B stored in the configuration memory 410.

In operation 1440, the apparatus sets a time for which the task B is to be accomplished.

In operation 1445, the apparatus determines whether the time set for the task B has passed. When it is determined in operation 1445 that the time set for the task B has not passed, the apparatus waits until the time set for the task B has passed. When it is determined in operation 1445 that the time set for the task B has passed, the method proceeds to operation 1450.

In operation 1450, the apparatus determines whether the accomplishment of both the task A and the task B is completed. When it is determined in operation 1450 that the accomplishment of both the task A and the task B is completed, the method ends. When it is determined in operation 1450 that the accomplishment of either the task A or the task B is not completed, the method proceeds to operation 1455.

In operation 1455, the apparatus determines whether the accomplishment of the task A is completed. When it is determined in operation 1455 that the accomplishment of the task A is not completed, the method returns to operation 1405 to accomplish the task A. When it is determined in operation 1455 that the accomplishment of the task A is completed, it is determined that the accomplishment of the task B is not completed, and thus the method returns to operation 1440 to set a time for the task B and accomplish the task B. Since the reconfigurable hardware 460 is already designed to accomplish the task B, a separate process for reconfiguring hardware is not necessary.

When it is determined in operation 1425 that the accomplishment of the task B is completed, the method proceeds to operation 1460. In operation 1460, the apparatus determines whether the accomplishment of the task A is completed. When it is determined in operation 1460 that the accomplishment of the task A is not completed, the method returns to operation 1415 to set a time for the task A and accomplish the task A. Since the reconfigurable hardware 460 is already designed to accomplish the task A, a separate process for reconfiguring hardware is not necessary.

When the time set for the task A has passed, the apparatus reconfigures the reconfigurable hardware 460 with the task B and then accomplishes the task B. Likewise, when the time set for the task B has passed, the apparatus reconfigures the reconfigurable hardware 460 with the task A and then accomplishes the task A. Even when there exist three or more tasks, since a time is scheduled for the plurality of tasks, the plurality of tasks can share one reconfigurable hardware 460.

As described above, when there exist a plurality of tasks including a plurality of pieces of hardware configuration information, since the plurality of tasks can share the configuration memory 410 and the reconfigurable hardware 460, memory utilization can be improved even in dynamic environment such as data dependent control flow or multi-tasking. Also, since a slot of a configuration memory in which hardware configuration information is to be stored is dynamically determined at runtime, the determination of the slot of the configuration memory can be optimized when the determination of the slot is dependent on the kind or size of data or when a plurality of programs simultaneously use the configuration memory. Also, since the state of a slot of the configuration memory and a command capable of changing the state of the slot are provided, the configuration memory can be managed by using user application programming interface (API).

The exemplary embodiments of the present invention may have embodied in a general purpose digital computer by running a program from a computer-readable recording medium. Data used in the exemplary embodiments of the present invention may be recorded by various means on the computer-readable recording medium. Examples of the computer-readable recording medium include storage media such as magnetic storage media (e.g., read-only memories (ROMs), floppy disks, or hard disks), optically readable media (e.g., compact disk-read only memories (CD-ROMs) or digital versatile disks (DVDs)).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing a configuration memory of reconfigurable hardware which can be reconfigured according to hardware configuration information, the method comprising:
   determining, using a computer, at least one slot capable of storing the hardware configuration information based on states of a plurality of slots of the configuration memory;
   mapping the determined at least one slot of the configuration memory with at least one storage area of an external memory; and
   storing hardware configuration information, which is stored in the external memory, in the determined at least one slot capable of storing the hardware configuration information,
   wherein the determining of the at least one slot is performed at runtime while codes resulting from compiling of a program for reconfiguring hardware are executed, and
   wherein when a lock command for a first slot among the slots is received, the method further comprises changing the state of the first slot from a loading state to an exclusive loading state or changing the state of the first slot from a valid state to an exclusive valid state, so that the first slot is mapped to a first storage area in the external memory and a second storage area other than the first storage area cannot be mapped to the first slot.

2. The method of claim 1, wherein, the determining of the slot comprises:
   selecting at least one slot of an invalid state where a slot of the configuration memory and a storage area of the external memory are not mapped to each other; and
   determining at least one slot capable of storing the hardware configuration information among the selected at least one slot of the invalid state.

3. The method of claim 2, wherein, when it is determined that all of the hardware configuration information cannot be stored in the slots of the invalid states, the selecting of the at least one slot of the invalid state further comprises selecting at least one slot of a valid state and changing the at least one slot of a valid state to an invalid state.

4. The method of claim 1, wherein when a prefetch command for a first slot among the slots is received, the method further comprises changing the state of the first slot from an invalid state to a loading state where the hardware configuration information is being received from the external memory.

5. The method of claim 4, wherein when the execution of the prefetch command for the first slot is completed, the method further comprises changing the state of the first slot from the loading state to a valid state.

6. The method of claim 1, wherein when an invalidate command for a first slot among the slots is received, the method further comprises changing the state of the first slot from a current state to an invalid state.

7. The method of claim 1, wherein when an unlock command for a first slot among the slots is received, the method further comprises changing the state of the first slot from an exclusive loading state to a loading state or changing the state of the first slot from an exclusive valid state to a valid state.

8. The method of claim 1, further comprising storing information on storage areas constituting the external memory and information on slots constituting the configuration memory,
   wherein the determining of the at least one slot comprises determining at least one slot by using the stored information on storage areas and the stored information on slots.

9. The method of claim 8, wherein the information on the storage areas comprises state information of slots mapped to the storage areas, index information of the mapped slots, and a size of the hardware configuration information,
   wherein the information on the slots comprises state information of the slots and index information of the mapped storage areas.

10. The method of claim 1, wherein, when there exist a plurality of tasks including one or more pieces of hardware configuration information, the storing of the hardware configuration information in the determined at least one slot comprises:

storing a first hardware configuration information of a first task in the configuration memory, wherein, when a time corresponding to the first task passes, the method further comprises:

determining at least one slot capable of storing a second hardware configuration information of a second task based on the states of the plurality of slots of the configuration memory; and storing the second hardware configuration information in the determined at least one slot capable of storing the second hardware configuration information.

11. The method of claim 10, wherein the determining of the at least one slot capable of storing the second hardware configuration information comprises:

selecting at least one slot of an invalid state where a slot of the configuration memory and a storage area of the external memory are not mapped to each other; and determining at least one slot capable of storing the second hardware configuration information among the selected at least one slot of the invalid state.

12. The method of claim 11, wherein the selecting of the at least one slot of the invalid state further comprises selecting at least one slot of a valid state and changing the at least one slot of a valid state to an invalid state when it is determined that all of the second hardware configuration information cannot be stored in the slots of the invalid states.

13. A non-transitory computer-readable recording medium having embodied thereon a computer program, that when executed by a computer, performs the method of claim 1.

14. An apparatus to manage a configuration memory of reconfigurable hardware which can be reconfigured according to hardware configuration information, the apparatus comprising:

a memory managing unit to determine at least one slot capable of storing the hardware configuration information based on states of a plurality of slots of the configuration memory at runtime while codes resulting from compiling of a program for reconfiguring hardware are executed, and to store hardware configuration information, which is stored in an external memory, in the determined at least one slot capable of storing the hardware configuration information; and a storing unit to store the states of the plurality of slots of the configuration memory, wherein the memory managing unit maps the determined at least one slot of the configuration memory with at least one storage area of the external memory and when it is determined by the memory managing unit that all of the hardware configuration information cannot be stored in slots of an invalid state, the memory managing unit selects at least one slot of a valid state and changes the at least one slot of a valid state to an invalid state.

15. The apparatus of claim 14, wherein the memory managing unit selects at least one slot of an invalid state where a slot of the configuration memory and a storage area of the external memory are not mapped to each other, and determines at least one slot capable of storing the hardware configuration information among the selected at least one slot of the invalid state.

16. The apparatus of claim 14, wherein, when there exist a plurality of tasks including one or more pieces of hardware configuration information, the memory managing unit stores a first hardware configuration information of a first task in the configuration memory, wherein when a time corresponding to the first task passes, the memory managing unit determines at least one slot capable of storing a second hardware configuration information of a second task based on the states of the plurality of slots of the configuration memory, and stores the second hardware configuration information in the determined slot capable of storing the second hardware configuration information.

17. The apparatus of claim 16, wherein, when the determined slot capable of storing the second hardware configuration information is a same slot which stores the first hardware configuration information, the memory managing unit changes the state of the same slot from a current state to an invalid state.

18. The apparatus of claim 17, wherein only pieces of the second hardware configuration information which differ from the first hardware configuration information stored in the same slot are newly stored.

19. The apparatus of claim 14, wherein when the memory managing unit receives a lock command for a first slot among the slots, the memory managing unit changes the state of the first slot from a loading state to an exclusive loading state or changes the state of the first slot from a valid state to an exclusive valid state, so that the first slot is mapped to a first storage area in the external memory and a second storage area other than the first storage area cannot be mapped to the first slot.

20. The apparatus of claim 19, wherein when the memory managing unit receives an unlock command for the first slot among the slots, the memory managing unit changes the state of the first slot from an exclusive loading state to a loading state or changes the state of the first slot from an exclusive valid state to a valid state.

* * * * *

UNITED STATES PATENT AND TRADEMARK OFFICE
CERTIFICATE OF CORRECTION

PATENT NO. : 8,402,410 B2  
APPLICATION NO. : 12/076276  
DATED : March 19, 2013  
INVENTOR(S) : Chae-seok Im et al.

Page 1 of 1

It is certified that error appears in the above-identified patent and that said Letters Patent is hereby corrected as shown below:

In the Claims:

Column 17, Line 47(Approx.), In Claim 14, delete "memory" and insert -- memory, --, therefor.

Signed and Sealed this  
Twenty-sixth Day of November, 2013

Margaret A. Focarino  
*Commissioner for Patents of the United States Patent and Trademark Office*